(12) United States Patent
Im et al.

(10) Patent No.: US 12,494,885 B2
(45) Date of Patent: Dec. 9, 2025

(54) SATELLITE COMMUNICATION METHOD AND APPARATUS FOR INTERNET OF THINGS COMMUNICATION

(71) Applicant: Electronics and Telecommunications Research Institute, Daejeon (KR)

(72) Inventors: Gyeong Rae Im, Daejeon (KR); Pan Soo Kim, Daejeon (KR); Joon Gyu Ryu, Daejeon (KR); Dong Hyun Jung, Daejeon (KR); Soo Yeob Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 908 days.

(21) Appl. No.: 17/540,792

(22) Filed: Dec. 2, 2021

(65) Prior Publication Data

US 2022/0182193 A1 Jun. 9, 2022

(30) Foreign Application Priority Data

Dec. 3, 2020 (KR) .......... 10-2020-0167803
Nov. 19, 2021 (KR) .......... 10-2021-0160150

(51) Int. Cl.
*H04L 5/00* (2006.01)
*H04B 7/195* (2006.01)

(52) U.S. Cl.
CPC ............. *H04L 5/006* (2013.01); *H04B 7/195* (2013.01); *H04L 5/0048* (2013.01); *H04L 5/0055* (2013.01)

(58) Field of Classification Search
CPC ..... H04L 5/006; H04L 5/0048; H04L 5/0055; H04L 1/0007; H04L 1/0009; H04L 27/2613; H04L 27/2692; H04B 7/195
See application file for complete search history.

(56) References Cited

U.S. PATENT DOCUMENTS

| 6,925,113 B2 | 8/2005 | Kim et al. |
| 7,477,633 B2 | 1/2009 | Mujtaba |

(Continued)

FOREIGN PATENT DOCUMENTS

| EP | 3 197 226 | 7/2017 | |
| EP | 3758268 A1 * | 12/2020 | ............ H04L 1/08 |

(Continued)

OTHER PUBLICATIONS

Hofmann et al., "Ultranarrowband Waveform for IoT Direct Random Multiple Access to GEO Satellites", Dec. 2019, IEEE Internet of Things Journal, vol. 6, No. 6 (Year: 2019).*

(Continued)

*Primary Examiner* — Justin T Van Roie
(74) *Attorney, Agent, or Firm* — KILE PARK REED & HOUTTEMAN PLLC (57) ABSTRACT

An operation method of an IoT terminal performing communications with a satellite may comprise: receiving a first signal from the satellite; determining a number of symbols constituting a preamble based on the first signal; generating a first frame including a preamble generated according to the determined number of symbols, and transmitting the generated first frame to the satellite; and generating a second frame including a preamble generated according to the determined number of symbols when a response signal to the first frame is received from the satellite, and transmitting the generated second frame to the satellite.

13 Claims, 4 Drawing Sheets

(56) References Cited

U.S. PATENT DOCUMENTS

| | | | |
|---|---|---|---|
| 8,068,510 B2 | 11/2011 | Kim et al. | |
| 8,707,126 B2 | 4/2014 | Lee et al. | |
| 10,893,397 B2 | 1/2021 | Li et al. | |
| 11,431,464 B2* | 8/2022 | Zhang | H04J 13/0062 |
| 2006/0215617 A1* | 9/2006 | Martin | H04B 7/212 |
| | | | 370/337 |
| 2020/0145126 A1 | 5/2020 | Nammi | |
| 2021/0243815 A1* | 8/2021 | Taherzadeh Boroujeni | |
| | | | H04L 1/0007 |
| 2021/0297218 A1 | 9/2021 | Li et al. | |
| 2021/0409142 A1* | 12/2021 | Kim | H04J 13/0051 |
| 2022/0159741 A1* | 5/2022 | Hoang | H04L 5/0012 |
| 2023/0397247 A1* | 12/2023 | Jung | H04B 7/18519 |

FOREIGN PATENT DOCUMENTS

| | | |
|---|---|---|
| KR | 10-2019-0100177 | 8/2019 |
| WO | 2018/125989 | 7/2018 |

OTHER PUBLICATIONS

Jie Ding et al, "Optimal Preamble Length for Spectral Efficiency in Grant-Free RA with Massive MIMO," School of Electronic Information and Communications, arXiv: 1905.00005vl [eess. SP], Apr. 30, 2019.

* cited by examiner

SATELLITE COMMUNICATION METHOD AND APPARATUS FOR INTERNET OF THINGS COMMUNICATION

CROSS-REFERENCE TO RELATED APPLICATIONS

This application claims priority to Korean Patent Applications No. 10-2020-0167803 filed on Dec. 3, 2020 and No. 10-2021-0160150 filed on Nov. 19, 2021 with the Korean Intellectual Property Office (KIPO), the entire contents of which are hereby incorporated by reference.

BACKGROUND

1. Technical Field

The present disclosure relates to a satellite communication technique, and more particularly, to a method of generating and transmitting a frame for improving reliability of communications between a low earth orbit (LEO) satellite and an Internet of things (IoT) terminal, and an apparatus therefor.

2. Related Art

In an IoT system using an LEO satellite, an IoT terminal may communicate directly with the satellite or perform relay communications through a terrestrial gateway or the like. The terrestrial IoT technologies, such as Long Range (LoRa), Ingenu, and narrow band-IoT (NB-IoT), have been studied, and IoT technologies for satellites are being studied based thereon. However, in terms of channel environments, a satellite channel environment is different from a terrestrial channel environment, and also in terms of base stations, there are many differences between a satellite base station and a terrestrial base station, so it is necessary to develop IoT technologies suitable for the satellite environment. In particular, in order for the LEO satellite and the IoT terminal to directly communicate, a link between the satellite and the IoT terminal should be established. In this case, it is required to develop a communication method that is stronger and more reliable than that of the terrestrial IoT system because of atmospheric absorption and path loss due to a relatively long communication path.

SUMMARY

Accordingly, exemplary embodiments of the present disclosure are directed to providing an operation method of an IoT terminal configured to perform communications with a satellite by using a variable frame structure for providing high reliability.

Accordingly, exemplary embodiments of the present disclosure are directed to providing a configuration of the IoT terminal.

According to a first exemplary embodiment of the present disclosure, an operation method of an IoT terminal performing communications with a satellite may comprise: receiving a first signal from the satellite; determining a number of symbols constituting a preamble based on the first signal; generating a first frame including a preamble generated according to the determined number of symbols, and transmitting the generated first frame to the satellite; and generating a second frame including a preamble generated according to the determined number of symbols when a response signal to the first frame is received from the satellite, and transmitting the generated second frame to the satellite.

The first signal may be a beacon signal or a physical broadcast channel (PBCH) broadcast from the satellite.

The number of symbols constituting the preamble may be increased or decreased based on a result of comparing a signal-to-noise ratio (SNR) value measured for the first signal with a threshold.

The threshold may be set according to a reception capability of the terminal or the satellite.

The number of symbols constituting the preamble may be determined according to an altitude of the satellite, a type of the satellite, an orbit of the satellite, an elevation angle of the satellite, and/or an atmospheric environment.

The operation method may further comprise, when a response signal indicating acknowledgement (ACK) for the first frame is received from the satellite, setting a coding scheme and/or code rate applied to a payload of the second frame to be identical to a coding scheme and/or code rate applied to a payload of the first frame.

The operation method may further comprise, when a response signal indicating negative acknowledgement (NACK) for the first frame is received from the satellite, setting the coding scheme applied to the payload of the second frame to be different from the coding scheme applied to the payload of the first frame, or lowering the code rate applied to the payload of the second frame than the code rate applied to the payload of the first frame.

The coding scheme applied to the payload of the first frame or the second frame may be a Hamming code, a convolutional code, a turbo code, or a low density parity check (LDPC) code.

The operation method may further comprise setting the number of symbols constituting the preamble of the second frame to be greater than the number of symbols constituting the preamble of the first frame when a response signal to the first frame is not received from the satellite.

According to a second exemplary embodiment of the present disclosure, an operation method of an IoT terminal performing communications with a satellite may comprise: obtaining information on the satellite; determining a number of symbols constituting a preamble and/or a coding scheme and/or code rate to be applied to a payload based on the information on the satellite; and generating a first frame by applying the determined number of symbols and/or the determined coding scheme and/or code rate, and transmitting the generated first frame to the satellite.

The information on the satellite may be received from a terrestrial gateway or a terrestrial base station.

The information on the satellite may include an altitude of the satellite, a type of the satellite, an orbit of the satellite, and/or an elevation angle of the satellite.

The number of symbols constituting the preamble may be determined according to the altitude of the satellite, the type of the satellite, the orbit of the satellite, the elevation angle of the satellite, and/or an atmospheric environment.

According to a third exemplary embodiment of the present disclosure, an IoT terminal performing communications with the satellite may comprise: a processor; a transceiver controlled by the processor; a memory electronically communicating with the processor; and instructions stored in the memory, wherein when executed by the processor, the instructions cause the IoT terminal to: receive a first signal from the satellite; determine a number of symbols constituting a preamble based on the first signal; generate a first frame including a preamble generated according to the determined number of symbols, and transmit the generated first frame to the satellite; and generate a second frame including a preamble generated according to the determined number of symbols when a response signal to the first frame is received from the satellite, and transmit the generated second frame to the satellite.

The first signal may be a beacon signal or a physical broadcast channel (PBCH) broadcast from the satellite.

The number of symbols constituting the preamble may be increased or decreased based on a result of comparing a signal-to-noise ratio (SNR) value measured for the first signal with a threshold.

When a response signal indicating acknowledgement (ACK) for the first frame is received from the satellite, the instructions may cause the IoT terminal to set a coding scheme and/or code rate applied to a payload of the second frame to be identical to a coding scheme and/or code rate applied to a payload of the first frame.

When a response signal indicating negative acknowledgement (NACK) for the first frame is received from the satellite, the instructions may cause the IoT terminal to set the coding scheme applied to the payload of the second frame to be different from the coding scheme applied to the payload of the first frame, or lower the code rate applied to the payload of the second frame than the code rate applied to the payload of the first frame.

The coding scheme applied to the payload of the first frame or the second frame may be a Hamming code, a convolutional code, a turbo code, or a low density parity check (LDPC) code.

The instructions may cause the IoT terminal to set the number of symbols constituting the preamble of the second frame to be greater than the number of symbols constituting the preamble of the first frame when a response signal to the first frame is not received from the satellite.

According to exemplary embodiments of the present disclosure, a frame structure having a more reliable and robust waveform than a conventional terrestrial IoT communication waveform can be used for satellite IoT communications. In particular, by using a frame structure variable adaptively to a communication environment between a satellite and an IoT terminal, it is made possible to increase a packet detection probability and reduce a packet error probability, thereby securing reliability of a communication link.

DETAILED DESCRIPTION OF THE EMBODIMENTS

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In an IoT system using an LEO satellite, an IoT terminal may communicate directly with the satellite or perform relay communications through a terrestrial gateway or the like. The terrestrial IoT technologies, such as Long Range (LoRa), Ingenu, and narrow band-IoT (NB-IoT), have been studied, and IoT technologies for satellites are being studied based thereon.

Figure 1:
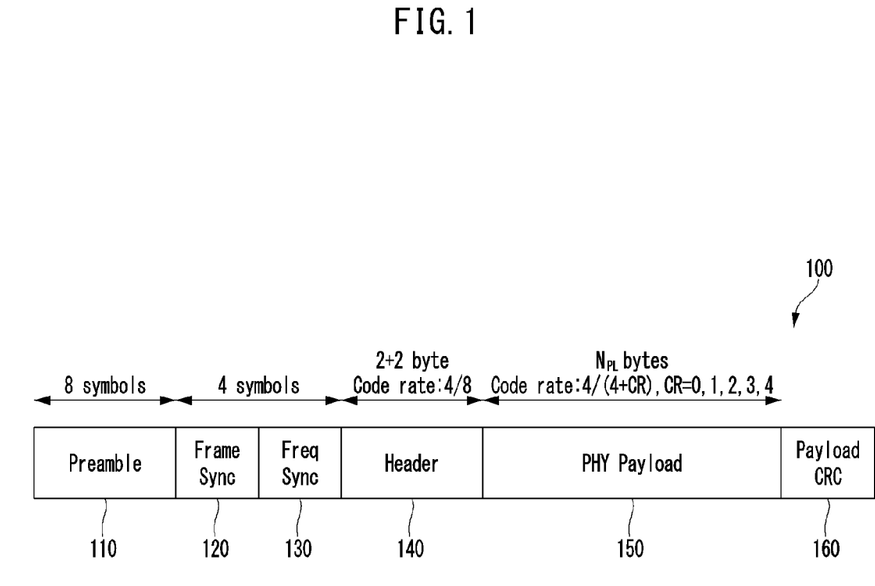
FIG. 1 is a conceptual diagram for describing a frame structure applied to terrestrial LoRa IoT communication.

FIG. 1 is a conceptual diagram for describing a frame structure applied to terrestrial LoRa IoT communication.

Referring to FIG. 1, a frame 100 used for the terrestrial LoRa includes a preamble 110 composed of eight symbols, two symbols 120 for frame synchronization, two symbols 130 for frequency synchronization, a header 140 having a length of 4 bytes (using 4/8 Hamming code), a payload 150 having a length of $N_{PL}$ bytes, and a payload cyclic redundancy check (CRC) 160. A chirp spread spectrum is used as a modulation scheme for the preamble, synchronization symbols, and payload symbols, and an extended Hamming code is used as an error correction code therefor.

However, in terms of channel environments, a satellite channel environment is different from a terrestrial channel environment, and also in terms of base stations, there are many differences between a satellite base station and a terrestrial base station, so it is necessary to develop IoT technologies suitable for the satellite environment. In particular, in order for the LEO satellite and the IoT terminal to directly communicate, a link between the satellite and the IoT terminal should be established. In this case, it is required to develop a communication method that is stronger and more reliable than that of the terrestrial IoT system because of atmospheric absorption and path loss due to a relatively long communication path. Accordingly, exemplary embodiments of the present disclosure propose a communication method that achieves higher reliability by changing the frame structure of LoRa, which is a terrestrial IoT communication method, to a link-adaptive frame structure.

In particular, exemplary embodiments of the present disclosure are directed to providing a variable frame structure that is robust to a satellite environment and can increase a packet detection probability in consideration of a one-to-one LEO satellite communication system in which a terminal directly communicates with an LEO satellite. Further, exemplary embodiments of the present disclosure are directed to providing a method for determining the number of symbols constituting a preamble and a method for determining a coding scheme and a code rate under the assumption that the frame structure can be varied.

VARIABLE FRAME STRUCTURE

In the LoRa frame for the existing terrestrial IoT described with reference to FIG. 1, eight symbols are used as a preamble. Since a signal-to-noise ratio (SNR) is very low in most satellite communication environments than in terrestrial communication environments, a frame structure that varies according to the SNR may be used in exemplary embodiments according to the present disclosure.

Figure 2:
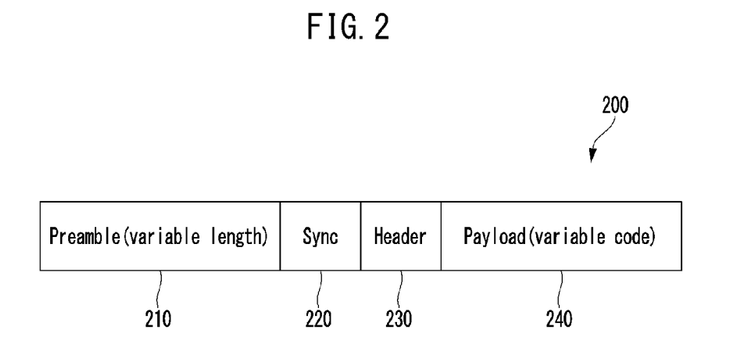
FIG. 2 is a conceptual diagram illustrating a variable frame structure for satellite IoT communications according to an exemplary embodiment of the present disclosure.

FIG. 2 is a conceptual diagram illustrating a variable frame structure for satellite IoT communications according to an exemplary embodiment of the present disclosure.

Referring to FIG. 2, in a frame 200 according to an exemplary embodiment of the present disclosure, the number of symbols constituting a preamble 210 may vary according to a reception SNR calculated or predicted from a reception signal. The preamble 210 may be used to detect a frame transmitted from a transmitting side (i.e., terminal or satellite) at a receiving side (i.e., satellite or terminal). For example, if an SNR measured for eight symbols constituting the preamble is equal to or greater than a threshold, it may be determined that the frame is detected. For example, when a variable for determining whether the preamble (i.e., frame) is detected is $D_0$, the variable $D_0$ set to 1 may indicate that the preamble (i.e., frame) is detected, and the variable $D_0$ set to 0 may indicate that the preamble (i.e., frame) is not detected. A default value of the variable $D_0$ may be set to 0. If δ denotes an effect of one symbol constituting the preamble on the reception SNR, determination of whether the frame is detected according to δ, a threshold $\gamma_{th}$, and the number N of symbols constituting the preamble may be expressed by Equation 1 below.

$$D_0 = \begin{cases} 1, & N\delta > \gamma_{th} \\ 0, & N\delta \leq \gamma_{th} \end{cases} \quad \text{[Equation 1]}$$

Here, the threshold $\gamma_{th}$ may be set differently according to a reception capability of a receiver. The number N of symbols constituting the preamble may vary depending on the altitude, type, and orbit of the satellite, the atmospheric environment, and/or the like. That is, as N increases, the detection probability of the frame may be proportionally increased. For example, if a large value of N is applied, the probability of detecting the preamble (i.e., frame) may be increased even in satellite IoT communications having a reception sensitivity lower than that of the terrestrial environment. In addition, in the existing LoRa frame for terrestrial IoT, a Hamming code is used to encode the header and the payload. In general, the Hamming code has low computational complexity, but is known to have lower reliability than other coding schemes.

Accordingly, in an exemplary embodiment of the present disclosure, the convolutional code may be applied to the header and payload to ensure higher reliability for satellite communications. In addition, the turbo code or low-density parity-check (LDPC) code may be used to achieve higher reliability and throughput. That is, in the frame 200 according to an exemplary embodiment of the present disclosure, the coding scheme applied to the header 230 and the payload 240 may vary depending on a computation capability of the terminal and/or base station or the channel environment.

APPLICATION OF VARIABLE FRAME STRUCTURE

Hereinafter, a method of performing communications by applying the above-described variable frame to a case where a satellite and an IoT terminal perform two-way communications and a case where only one-way communication from the terminal to the satellite is performed will be described.

That is, in the case of the satellite IoT service, the terminal and the satellite may perform bidirectional signal transmissions or unidirectional signal transmission from the terminal to the satellite depending on whether the terminal can use a global navigation satellite system (GNSS), performances (e.g., performance of application processor (AP), etc.), and/ or the like.

Figure 3:
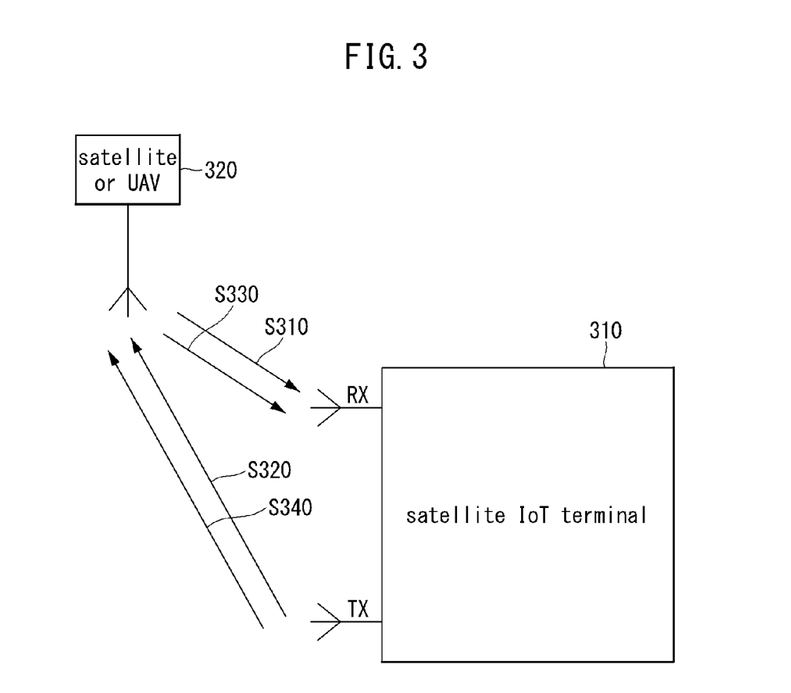
FIG. 3 is a conceptual diagram illustrating a method of applying a variable frame structure to two-way communications between a satellite and a terminal according to an exemplary embodiment of the present disclosure.

FIG. 3 is a conceptual diagram illustrating a method of applying a variable frame structure to two-way communications between a satellite and a terminal according to an exemplary embodiment of the present disclosure.

Referring to FIG. 3, when two-way communications between an IoT terminal 310 and a satellite 320 are possible, the IoT terminal 310 may receive a beacon or a physical broadcast channel (PBCH) according to the 3GPP technical specifications, which is broadcast from the satellite 320 (S310). The beacon or PBCH may include synchronization information. The IoT terminal 310 may attempt random access to the satellite 320 based on the signal (e.g., beacon or PBCH) received from the satellite 320, and measure an SNR of the received signal. The signal (e.g., beacon or PBCH) transmitted from the satellite 320 may include synchronization information, transmission time information, orbit information (e.g., ephemeris) of the satellite, elevation angle information of the satellite, and the like.

The IoT terminal 310 may determine a spreading factor used for modulation of symbols, a coding scheme and/or a code rate, and/or the number of symbols constituting a preamble based on the measured SNR. In this case, the number of symbols constituting the preamble may be determined based on Equation 1 described above. The terminal may generate the variable frame described above with reference to FIG. 2 based on the determined spreading factor, coding scheme and/or code rate, and/or number of symbols constituting the preamble.

When a link between the satellite 320 and the IoT terminal 310 is established, the IoT terminal 310 may predict a degree of Doppler shift and perform pre-compensation to which the predicted Doppler shift is reflected, and transmit a signal including the generated frame to the satellite (S320). When the IoT terminal 310 does not perform the pre-compensation reflecting the Doppler shift, the satellite 320 may compensate for the Doppler shift according to the computation capability of the satellite 320. Meanwhile, the IoT terminal 310 may calculate a round time delay (RTD) between the IoT terminal 310 and the satellite 320 based on the orbit, altitude, and/or elevation angle of the satellite 320, and may set a timer based on the calculated RTD.

The operation of the IoT terminal 310 may vary depending on whether a response signal to the frame transmitted from the IoT terminal 310 to the satellite 320 is received from the satellite 320.

If the satellite 320 does not detect the frame transmitted from the IoT terminal 310, the satellite may not transmit a response signal. If a response signal is not received from the satellite 320 until the set timer expires, the IoT terminal 310 may increase the number of symbols constituting a preamble of a frame to be transmitted later than the number of symbols constituting the preamble of the previously transmitted frame. That is, the IoT terminal 310 may increase a detection probability of the frame to be transmitted later by increasing the length of the preamble of the frame to be transmitted later.

On the other hand, if a response signal to the frame transmitted from the IoT terminal 310 is received from the satellite 320 until the set timer expires (S330), the IoT terminal 310 may determine that the satellite 320 has normally detected the frame. The success of frame detection may be classified into a case where decoding of the payload is successful and a case where the decoding of the payload is unsuccessful.

For example, if the response signal indicates acknowledgment (ACK), the IoT terminal 310 may identify that the payload of the frame transmitted by the IoT terminal 310 has been successfully decoded by the satellite 320. In this case, the IoT terminal 310 may apply the coding scheme applied to the payload of the previous frame to the frame to be transmitted later without change.

On the other hand, if the response signal indicates a negative acknowledgment (NACK), the IoT terminal 310 may identify that the decoding of the payload of the frame transmitted by the IoT terminal 310 has failed in the satellite 320. In this case, the IoT terminal 310 may set the coding scheme to be applied to the frame to be transmitted later to be different from the coding scheme applied to the payload of the previously transmitted frame. Alternatively, the IoT terminal 310 may set a code rate applied to the payload of the frame to be transmitted later to be lower than the code rate applied to the payload of the previously transmitted frame.

Finally, the IoT terminal 310 may generate a frame for which the number of symbols constituting the preamble, coding scheme, and/or code rate are maintained or changed, and may transmit the generated frame to the satellite 320 (S340). While the steps S320 to S340 are repeatedly performed, the structure of the frame used for communications between the satellite and the terminal may vary depending on the channel environment.

Figure 4:
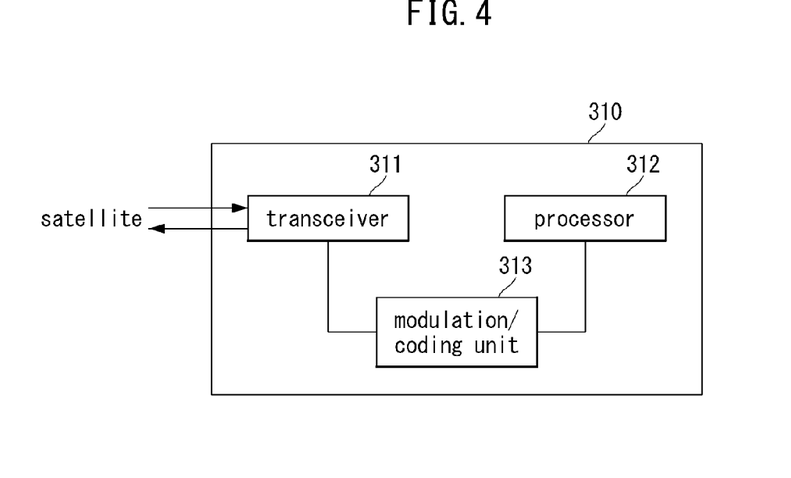
FIG. 4 is a block diagram illustrating a structure of an IoT terminal for performing the method described in FIG. 3.

FIG. 4 is a block diagram illustrating a structure of an IoT terminal for performing the method described in FIG. 3.

Referring to FIG. 4, the IoT terminal 310 may include a transceiver 311 capable of performing transmission/reception with the satellite 320, a processor 312, and a modulation/coding unit 313. Although the modulation/coding unit 313 is illustrated as a component separated from the processor 312 in FIG. 4, the processor 312 may also serve as the modulation/coding unit 313. In addition, operations of the processor 312 to be described later may be operations performed by the processor 312 when instructions stored in a memory are executed by the processor 312.

Describing the method of FIG. 3 with reference to FIGS. 3 and 4, the signal of the step S310 may be broadcast from the satellite 320, and the processor 312 may control the transceiver 313 to receive the signal (S320). As mentioned above, the signal of the step S320 may be a beacon or PBCH.

The transceiver 311 of the terminal may measure an SNR of the received signal, and the processor 312 may determine, based on Equation 1 described above, the number N of symbols constituting a preamble and/or a coding scheme and/or code rate applied to a header and a payload of a frame to be transmitted.

The processor 312 may cause the modulation/coding unit 313 to generate a frame by performing modulation and coding by reflecting the determined N and coding scheme and/or code rate, and transmit the generated frame to the satellite 320 (S330). In this case, the processor 312 may set a timer when transmitting the frame.

If a response signal is not received from the satellite 320 until the set timer expires, the processor 312 may increase the number of symbols constituting a preamble of a frame to be transmitted later than the number of symbols constituting the previously transmitted preamble.

When a response signal indicating ACK is received from the satellite 320 until the set timer expires, the processor 312 may set the coding scheme and/or code rate applied to the payload of the frame to be transmitted later to be the same as the coding scheme and/or code rate applied to the payload of the previously transmitted frame.

When a response signal indicating NACK is received from the satellite 320 until the set timer expires, the processor 312 may set the coding scheme applied to the payload of the frame to be transmitted later to be different from the coding scheme applied to the payload of the previously transmitted frame, or set the code rate applied to the payload of the frame to be transmitted later to be lower than the code rate applied to the payload of the previously transmitted frame.

Figure 5:
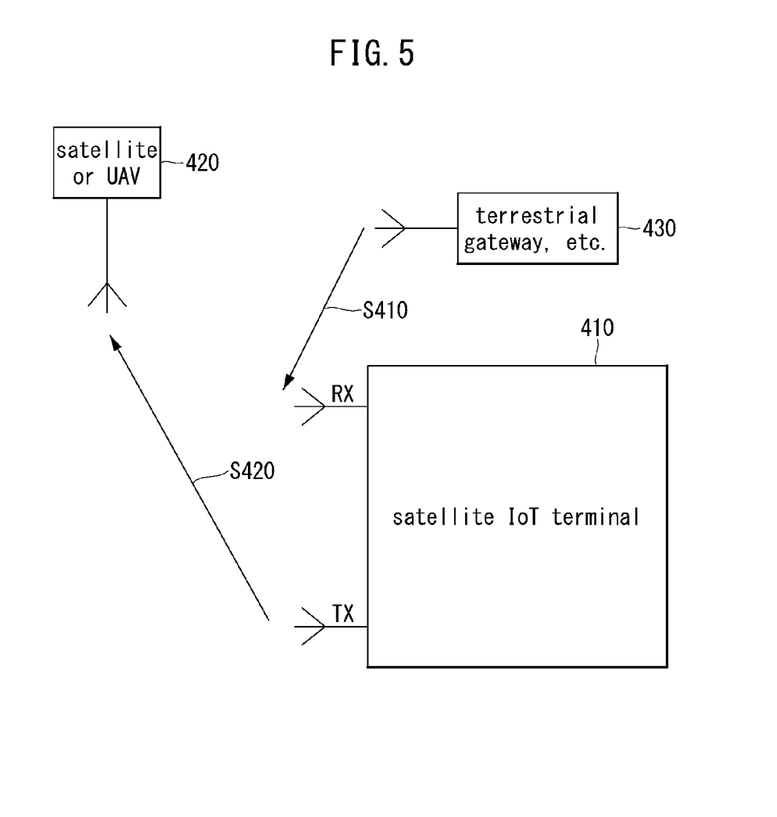
FIG. 5 is a conceptual diagram illustrating a method of applying a variable frame structure to one-way communications between a satellite and a terminal according to an exemplary embodiment of the present disclosure.

FIG. 5 is a conceptual diagram illustrating a method of applying a variable frame structure to one-way communications between a satellite and a terminal according to an exemplary embodiment of the present disclosure.

When the IoT terminal does not have capability to receive a signal (e.g., beacon or PBCH) transmitted from the satellite, the IoT terminal is required to obtain information on the satellite from an entity other than the satellite. Referring to FIG. 5, for example, the IoT terminal 410 may receive the information on the satellite 420 from a terrestrial gateway 430 (e.g., terrestrial base station) (S410). Alternatively, the IoT terminal 410 may pre-store information on connection target satellites including the satellite 420. The information on the satellite may include an altitude of the satellite, a type of the satellite, an orbit of the satellite, and/or an elevation angle of the satellite. In addition, the information on the satellite may further include information on a time period during which the satellite is exposed to the IoT terminal.

The IoT terminal 410 may predict a time when the satellite 420 passes over the IoT terminal 410 based on the information, and predict a reception SNR based on the altitude and elevation angle of the satellite 420, and determine a spreading factor, the number of symbols constituting a preamble, a coding scheme, and/or code rate, which are to be applied to a frame to be transmitted to the satellite 420. The IoT terminal 410 may generate a frame based on the determined spreading factor, number of symbols constituting the preamble, coding scheme, and/or code rate, and transmit the generated frame to the satellite 420 (S420).

Meanwhile, the IoT terminal 410 may receive updated information on the satellite from the terrestrial gateway 430 (or terrestrial base station) periodically, in a request-based manner, or in an event-based manner. When there is a change in the information on the satellite, the IoT terminal 410 may re-determine a spreading factor, number of symbols constituting a preamble, coding scheme, and/or code rate, which are to be applied to a frame to be transmitted to the satellite 420, and determine a structure of the frame to be transmitted later based on the re-determined spreading factor, number of symbols constituting the preamble, coding scheme, and/or code rate.

Figure 6:
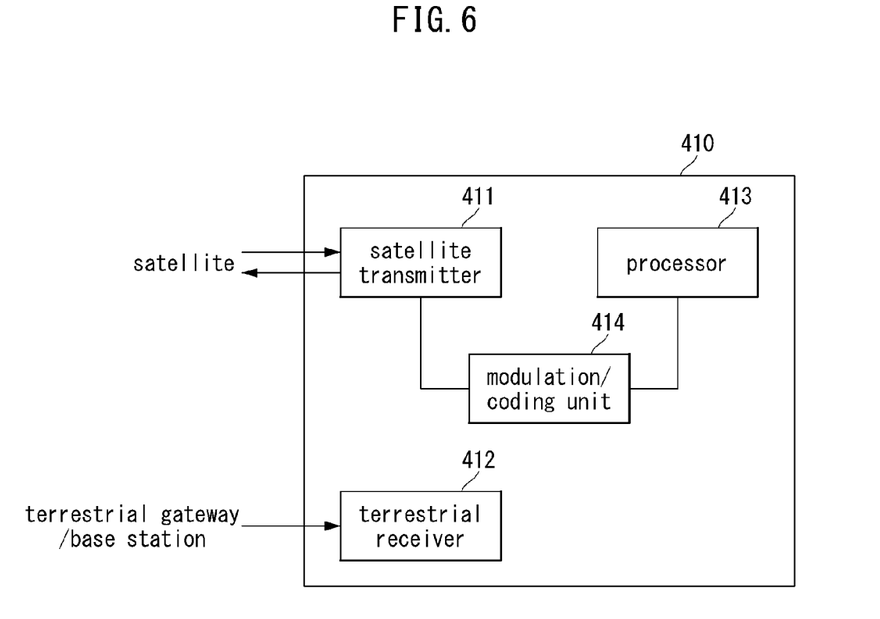
FIG. 6 is a block diagram illustrating a structure of an IoT terminal for performing the method described in FIG. 5.

FIG. 6 is a block diagram illustrating a structure of an IoT terminal for performing the method described in FIG. 5.

Referring to FIG. 6, the IoT terminal 410 may include a satellite transmitter 411 capable of transmitting a signal to the satellite 420, a terrestrial receiver 412 capable of performing reception from a terrestrial gateway or terrestrial base station, a processor 413, and a modulation/coding unit 414. Although the modulation/coding unit 414 is illustrated as a component separated from the processor 413 in FIG. 6, the processor 413 may also serve as the modulation/coding unit 414. In addition, operations of the processor 413 to be described later may be operations performed by the processor 413 when instructions stored in a memory are executed by the processor 413.

Describing the method of FIG. 5 with reference to FIGS. 5 and 6, the processor 413 may receive the information on the satellite 420 from the terrestrial gateway 430 (or terrestrial base station) through the terrestrial receiver 412 (S410). Alternatively, the IoT terminal 410 may pre-store information on connection target satellites including the satellite 420.

The processor 413 may predict a time when the satellite 420 passes over the IoT terminal 410 based on the information, and may determine a spreading factor, number of symbols constituting a preamble, coding scheme, and/or code rate, which are to be applied to a frame to be transmitted to the satellite 420 based on an altitude and an elevation angle of the satellite 420. The processor 413 may cause the modulation/coding unit 414 to generate a frame based on the determined spreading factor, number of symbols constituting the preamble, coding scheme, and/or code rate, and transmit the generated frame to the satellite 420 through the satellite transmitter 411 (S420).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of an Internet of things (IOT) terminal performing communications with a satellite, the operation method comprising:
   receiving a first signal from the satellite;
   determining a number of symbols constituting a preamble based on the first signal;
   generating a first frame including a first preamble generated according to the determined number of symbols, and transmitting the generated first frame to the satellite; and
   generating a second frame including a second preamble generated according to the determined number of symbols when a response signal to the first frame is received from the satellite, and transmitting the generated second frame to the satellite,
   wherein the second preamble is configured identically to the first preamble, or configured differently from the first preamble, and the determined number of symbols is increased or decreased based on a result of comparing a signal-to-noise ratio (SNR) value measured for the first signal with a threshold,
   wherein the threshold is set according to a reception capability of the terminal or the satellite.

2. The operation method according to claim 1, wherein the first signal is a beacon signal or a physical broadcast channel (PBCH) broadcast from the satellite.

3. The operation method according to claim 1, wherein the number of symbols is determined according to at least one of an altitude of the satellite, a type of the satellite, an orbit of the satellite, an elevation angle of the satellite, and an atmospheric environment.

4. The operation method according to claim 1, further comprising, when a response signal indicating acknowledgement (ACK) for the first frame is received from the satellite, setting at least one of a coding scheme and code rate applied to a payload of the second frame to be identical to at least one of a coding scheme and code rate applied to a payload of the first frame.

5. The operation method according to claim 4, further comprising, when a response signal indicating negative acknowledgement (NACK) for the first frame is received from the satellite, setting the coding scheme applied to the payload of the second frame to be different from the coding scheme applied to the payload of the first frame, or lowering the code rate applied to the payload of the second frame than the code rate applied to the payload of the first frame.

6. The operation method according to claim 4, wherein the coding scheme applied to the payload of the first frame or the second frame is a Hamming code, a convolutional code, a turbo code, or a low density parity check (LDPC) code.

7. The operation method according to claim 1, further comprising setting the number of symbols constituting the second preamble of the second frame to be greater than the number of symbols constituting the first preamble of the first frame when a response signal to the first frame is not received from the satellite.

8. An Internet of things (IOT) terminal performing communications with the satellite, the IoT terminal comprising:
  a processor;
  a transceiver controlled by the processor;
  a memory electronically communicating with the processor; and
  instructions stored in the memory,
  wherein when executed by the processor, the instructions cause the IoT terminal to:
    receive a first signal from the satellite;
    determine a number of symbols constituting a preamble based on the first signal;
    generate a first frame including a first preamble generated according to the determined number of symbols, and transmit the generated first frame to the satellite; and
    generate a second frame including a second preamble generated according to the determined number of symbols when a response signal to the first frame is received from the satellite, and transmit the generated second frame to the satellite,
  wherein the second preamble is configured identically to the first preamble, or configured differently from the first preamble, and the determined number of symbols is increased or decreased based on a result of comparing a signal-to-noise ratio (SNR) value measured for the first signal with a threshold,
  wherein the threshold is set according to a reception capability of the terminal or the satellite.

9. The IoT terminal according to claim 8, wherein the first signal is a beacon signal or a physical broadcast channel (PBCH) broadcast from the satellite.

10. The IoT terminal according to claim 8, wherein, when a response signal indicating acknowledgement (ACK) for the first frame is received from the satellite, the instructions cause the IoT terminal to set at least one of a coding scheme and code rate applied to a payload of the second frame to be identical to at least one of a coding scheme and code rate applied to a payload of the first frame.

11. The IoT terminal according to claim 10, wherein, when a response signal indicating negative acknowledgement (NACK) for the first frame is received from the satellite, the instructions cause the IoT terminal to set the coding scheme applied to the payload of the second frame to be different from the coding scheme applied to the payload of the first frame, or lower the code rate applied to the payload of the second frame than the code rate applied to the payload of the first frame.

12. The IoT terminal according to claim 10, wherein the coding scheme applied to the payload of the first frame or the second frame is a Hamming code, a convolutional code, a turbo code, or a low density parity check (LDPC) code.

13. The IoT terminal according to claim 8, wherein the instructions cause the IoT terminal to set the number of symbols constituting the second preamble of the second frame to be greater than the number of symbols constituting the first preamble of the first frame when a response signal to the first frame is not received from the satellite.

* * * * *